March 17, 1970 — H. MUELLER — 3,501,414
SEPARATING DEVICE
Filed Jan. 31, 1968

Inventor:
Hans Mueller
By Michael S. Striker
Attorney

United States Patent Office 3,501,414
Patented Mar. 17, 1970

3,501,414
SEPARATING DEVICE
Hans Mueller, Erlenbach, Zurich, Switzerland, assignor to Process Engineering Company, S.A., Mannedorf, Zurich, Switzerland
Filed Jan. 31, 1968, Ser. No. 702,053
Claims priority, application Switzerland, Feb. 28, 1967, 3,018/67
Int. Cl. B01d 45/00; B01f 7/20
U.S. Cl. 252—361
12 Claims

ABSTRACT OF THE DISCLOSURE

A housing defines an inner chamber which is adapted to contain a quantity of foam consisting of a gaseous phase and a liquid phase in intimate dispersion. A shaft is rotatable in the housing and carries at least two funnel-shaped members one of which is nested within the other and together these define between their respective outer and inner circumferential surfaces an annular gap in which separation of the gaseous phase from the liquid phase is effected by centrifugal deposition of the liquid phase on the inner circumferential surface of the outermost member.

CROSS REFERENCE TO RELATED APPLICATION

A related application was filed in the name of Hans Mueller under the title "Mixer" on July 3, 1967 and has Ser. No. 651,054.

BACKGROUND OF THE INVENTION

The present invention relates to the processing of mixed liquid and gaseous phases. Still more particularly, the present invention relates to the separation of the gaseous phase from the liquid phase where the two phases have been admixed and form a foam.

In my afore-mentioned application I have set forth the reasons why it is frequently necessary to effect intimate admixture of two or more components with maximum intimacy. Specifically, this is required usually in fermentation processes where two or more such components which are not soluble one in the other, must be admixed. It is desirable under these circumstances, or even necessary, that the particles of the components which are being admixed with one another be able to remain in contact for a relatively long period of time.

To effect such admixture I have set forth in the afore-mentioned copending application a method and an apparatus which will provide for intimate admixture of two or more components, namely gaseous and liquid components. As a result of such admixture and as a result of reaction processes which take place during and in response to the admixture, foam develops in relatively large quantities. This foam is frequently so stable, that is so resistant to breakdown into its individual components, that it is impossible to withdraw from the vessel in which treatment is carried out the gaseous and liquid reaction products separately, unless complicated and relatively expensive devices are provided for effecting separation of the foam into its constituent components. Another way of obtaining this result besides using mechanical devices, is to add to the contents of the vessel certain suitable substances. However, this latter approach is undesirable in many circumstances, particularly where microbiological processes are under way in fermentation vessels, because it may be disadvantageous to such processes.

It is thus a general object of the present invention to provide for the separation of such foam into its constituent gaseous and liquid components.

More particularly it is an object of the present invention to provide a simple, inexpensive and uncomplicated device for this purpose.

SUMMARY OF THE INVENTION

In accordance with one feature of my invention I provide a device of the type here under discussion which comprises a housing defining an inner chamber which is adapted to contain a quantity of foam, such foam consisting of a gaseous phase and a liquid phase in intimate dispersion. Separating means is arranged in the chamber immersed in the quantity of foam and is operative for effecting centrifugal separation of the gaseous phase and the liquid phase from one another.

Resort to my novel device makes possible optimum recovery of the liquid phase and foam-free recovery of the gaseous phase. This is achieved with the device which is both simple and inexpensive and which can be readily incorporated in existing mixing devices, for instance of the type outlined in my afore-mentioned copending application.

The novel features which are considered as characteristic for the invention are set forth in particular in the appended claims. The invention itself, however, both as to its construction and its method of operation, together with additional objects and advantages thereof, will be best understood from the following specific embodiments when read in connection with the accompanying drawings.

DESCRIPTION OF THE PREFERRED EMBODIMENTS

Figure 1:
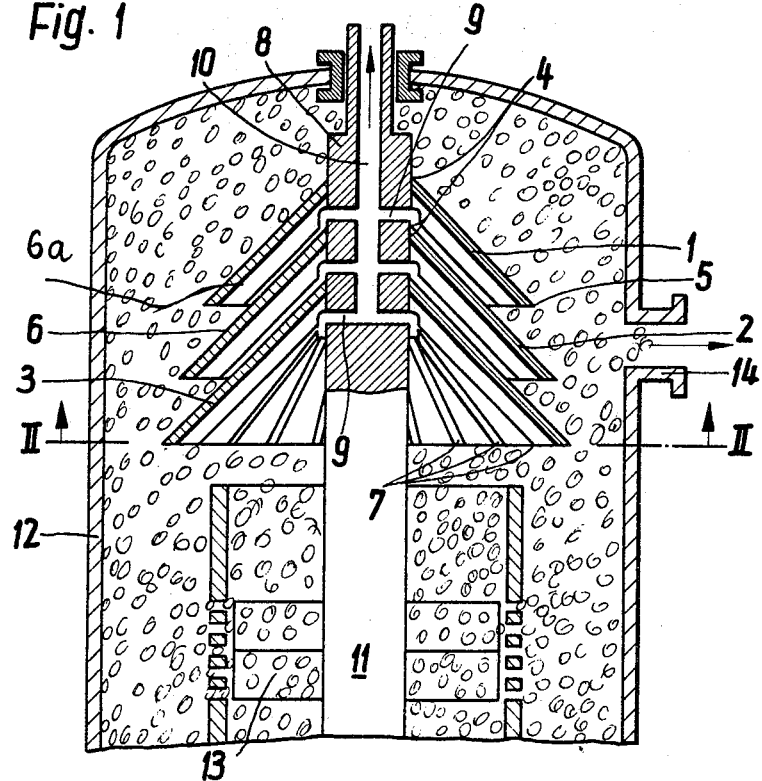
FIG. 1 is a vertical section taken on the line I—I of FIG. 2.

Discussing now the drawing in detail, it will be seen that my novel device comprises, in the illustrated embodiment, a housing 12 which defines an internal chamber having an outlet 14. Arranged within this chamber is a rotatable shaft 11 carrying mixing means 13 for admixing the components which are to be treated, that is the liquid and gaseous phases, in the manner in which this is for example discussed in my afore-mentioned copending application, Ser. No. 651,054.

During such admixture, there occurs the formation of rather stable foam that is foam whose gas bubbles are very small and resist breakdown. Some of the liquid reaction products will of course be available in undispersed condition, that is in liquid form and these are withdrawn through the outlet 14 of the housing 12. However, it is impossible to withdraw this liquid without also withdrawing relatively large quantities of foam. This is of course not desirable because the spent gaseous phase must be separated from the liquid reaction products. Particularly if, as is the case in microbiological processes, large quantities of gas—in form of air, oxygen or hydrocarbons—must continuously be admitted into the relatively small chamber defined by the housing 12 for carrying out the microbiological processes.

It is therefore necessary to break down the masses of foam which develop within the housing 12, so that the spent gaseous phase can be recovered from the foam and withdrawn, while the recovered liquid phase can similarly be withdrawn separately from the gaseous phase. For this purpose an end portion 8 of the rotary shaft 11 carries a plurality of substantially funnel-shaped elements, of which three are shown in FIG. 1 which are identified with reference numerals 1, 2 and 3, respectively. The number of such elements could of course be smaller, namely two or it could be larger.

In accordance with the invention the elements 1, 2, and 3 are axially arrayed on the end portion 8 of the shaft 11 in such a manner that the narrower end of the member 2 extends into the interior of the member 1, whereas the narrower end of the member 3 extends into the interior of the member 2. Thus, the member 2 is nested within the member 1, and the member 3 is nested within the member 2. FIG. 1 clearly shows, however, that this nesting is accomplished in such a manner that there is defined between the outer circumferential surface 6 of one member and the inner circumferential surface 6a of the member within which it is nested, an annular gap. It will be noted that these surfaces 6 and 6a extend in parallelism with one another. The width of the gap may be such that a plurality of circumferentially distributed substantially radially extending ribs 7 which are provided on the respective inner circumferential surfaces 6a and project therefrom towards the respective opposed outer circumferential surfaces 6, may either touch the opposed outer circumferential surface 6 or may define a small space therewith, as illustrated in the case of FIG. 1.

The operation of the device illustrated will be obvious. As the shaft 11 is rotated, so that foam is created by the action of the mixing means 13 carried on the shaft 11 below the members 1, 2 and 3 the foam will rise into the gaps between the juxtaposed surfaces 6a and 6 and will, in fact surround the members 1, 2 and 3 as is illustrated in FIG. 1. Relatively high speed rotation of the shaft 11 will, of course effect simultaneous rotation of the members 1, 2 and 3 which are carried by the end portion 8 of the shaft 11 with which they are rigid. The foam entrapped in the gaps between the juxtaposed surfaces 6 and 6a is carried along for rotational movement by the presence of the ribs 7 and the liquid component of the foam, that is the liquid phase, is deposited under the influence of centrifugal force on the respective outer circumferential surface 6a of the members 1, 2 and 3. The reason for this is the greater weight of the liquid component than that of the gaseous component. As a result of such deposition the liquid component is separated from gaseous component and the separated liquid will of course run downwardly off the respective surfaces 6 and into the container defined by the housing 12 for recovery through the outlet 14 or in any other desired manner. The separated gaseous component, on the other hand, is entrapped between any two adjacent ribs 7 which in effect constitute a guide channel, and rises in upward direction. The end portion 8 of the shaft 11 is provided in the illustrated embodiment, with an axially extending passage 10 with which cross bores 9 communicate. These cross bores 9 also communicate with the gaps existing between the juxtaposed surfaces 6 and 6a at the respective narrower ends of the members 1, 2 and 3. Thus, gaseous component rising in upward direction in the respective gaps will enter into the cross bores 9 from where it will pass into the passage 10 to be vented therefrom in the direction of the arrow associated with the passage 10. This, of course, results in complete separation of liquid phase from gaseous phase, and it provides this effect with very simple and inexpensive means.

Figure 2:
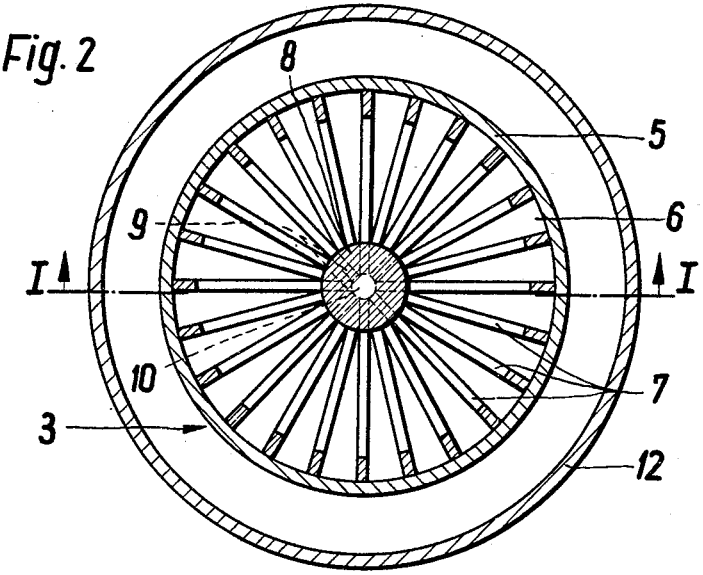
FIG. 2 is a section taken on the line II—II of FIG. 1.

FIG. 2 which is a section taken on the line II—II of FIG. 1, is self-explanatory.

It should be pointed out that the novel device illustrated herein may of course be employed under other circumstances and in other constructions than those described with reference to FIGS. 1 and 2. It is, for instance, not necessary, that the foam be produced in the same vessel in which it is separated into its constituent components. It is further not necessary that the novel device be provided on an end portion of the shaft 11 which carries the mixing means 13. Rather, the portion corresponding to the end portion 8 in FIG. 1 may be a separate shaft which can be secured in suitable manner to the shaft 11, or to any other rotatable shaft.

It will be understood that each of the elements described above, or two or more together, may also find a useful application in other types of constructions, differing from the types described above.

While the invention has been illustrated and described as embodied in a device for separating gaseous and liquid phases from one another, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A device of the character described, comprising, in combination, a housing defining an inner chamber adapted to contain a quantity of foam consisting of a gaseous phase and a liquid phase in intimate dispersion; a rotatable shaft arranged in said chamber; at least two funnel-shaped elements carried by said shaft in said chamber and each having a wider end and a narrower end, said elements being nested one within the other and defining with one another an annular gap; and passage means communicating with said annular gap via said shaft in the region of said narrower ends of said elements, rotation of said shaft and elements resulting in centrifugal deposition of the liquid phase of foam in said gap on an inner surface of said other element and thereby in separation of said phases from one another with the separated gaseous phase escaping from said gap into said passage means.

2. A device as defined in claim 1, wherein said housing is stationary.

3. A device as defined in claim 1, wherein said chamber has an inner diameter substantially greater than the maximum diameter of said elements so that the latter are everywhere inwardly spaced from the inner circumferential surface bounding said chamber.

4. A device as defined in claim 1, wherein said shaft has a free exterior end portion; said passage means comprising a passage provided in said shaft having an open end in the region of said free exterior end portion and communicating with said annular gap.

5. A device as defined in claim 1, wherein said one element has an outer circumferential surface and said other element has an inner circumferential surface juxtaposed with said outer circumferential surface and defining therewith said annular gap; and further comprising guide means provided on said inner circumferential surface and defining a plurality of channels extending from said wide end of said other element towards said narrower end and said passage means for conducting separated gaseous fraction into said passage means.

6. A device as defined in claim 5, wherein said guide means comprises a plurality of substantially radial ribs.

7. A device as defined in claim 6, wherein said ribs project from said inner circumferential surface towards, but short of, said outer circumferential surface.

8. A device as defined in claim 6, wherein said ribs project from said inner circumferential surface into engagement with said outer circumferential surface.

9. A device as defined in claim 1, wherein said one element has an outer circumferential surface and said other element has an inner circumferential surface spaced from and parallel to said outer circumferential surface of said one element and defining with the same said annular gap.

10. A device as defined in claim 9, wherein said chamber is an upright reactor chamber into which said gaseous and liquid phases are admitted for initial admixture resulting in formation of said quantity of foam, said reactor chamber having an upper and a lower portion and said shaft extending from one to the other of said portions; and further comprising rotary agitating means provided on said shaft and carried thereby at a level below said elements for rotation with said shaft, whereby said gaseous and liquid phases are initially agitated and admixed by said agitating means with resultant formation of foam, and whereby such foam is subsequently separated by said elements into its gaseous and liquid phases.

11. A device as defined in claim 1; further comprising at least an additional funnel-shaped element nested in said one element and defining therewith an additional annular gap; and wherein said passage means also communicates with said additional annular gap.

12. A device as defined in claim 11, wherein said passage means comprising a main passage extending axially in said shaft, and at least two transverse passages provided in said shaft and each communicating with said main passage and with one of said annular gaps.

References Cited

UNITED STATES PATENTS

| 1,132,702 | 3/1915 | Chandler | 259—7 |
| 1,967,938 | 7/1934 | Jantzen et al. | 55—178 |
| 2,610,155 | 9/1952 | Humfeld et al. | 55—178 |
| 2,840,460 | 6/1958 | Masek et al. | 259—8 |

NORMAN YUDKOFF, Primary Examiner

J. SOFER, Assistant Examiner

U.S. Cl. X.R.

259—8; 55—178